United States Patent [19]

Minamida et al.

[11] Patent Number: 5,306,890
[45] Date of Patent: Apr. 26, 1994

[54] METHOD OF PRODUCING CORRUGATED METAL SHEETING AND METHOD OF PRODUCING HONEYCOMB STRUCTURE THEREFROM FOR CARRYING CATALYTIC AGENTS USED FOR PURIFYING EXHAUST GASES

[75] Inventors: Katsuhiro Minamida; Motoi Kido; Atsushi Sugihashi; Masahi Oikawa; Naoya Hamada; Akira Ishibashi, all of Sagamihara, Japan

[73] Assignee: Nippon Steel Corporation, Tokyo, Japan

[21] Appl. No.: 710,462

[22] Filed: Jun. 5, 1991

[30] Foreign Application Priority Data

Jun. 5, 1990 [JP] Japan .................................. 2-145479
Oct. 18, 1990 [JP] Japan .................................. 2-277893

[51] Int. Cl.⁵ .............................................. B23K 26/00
[52] U.S. Cl. ............................ 219/121.64; 219/121.82
[58] Field of Search .................. 219/121.63, 121.64, 219/121.82, 121.13, 121.14, 121.73, 121.74, 121.75; 228/173.7

[56] References Cited

U.S. PATENT DOCUMENTS

| | | | |
|---|---|---|---|
| 3,185,815 | 5/1965 | Anderson | 219/137 |
| 3,486,218 | 12/1969 | Buyze | 29/472.3 |
| 4,824,011 | 4/1989 | Maus et al. | 219/121.63 |
| 4,912,297 | 3/1990 | Beyer et al. | 219/121.63 |
| 4,942,285 | 7/1990 | Ishikawa | 219/121.64 |

FOREIGN PATENT DOCUMENTS

| | | | |
|---|---|---|---|
| 0011752 | 1/1984 | Japan | 219/121.63 |
| 0180687 | 8/1986 | Japan | 219/121.63 |

*Primary Examiner*—C. L. Albritton
*Attorney, Agent, or Firm*—Wenderoth, Lind & Ponack

[57] ABSTRACT

A method of producing a corrugated metal sheeting including a flat metal sheet and a corrugated metal sheet joined to each other, which sheeting is used to produce a carrier or honeycomb structure for carrying catalytic agents used for purifying exhaust gases from, for example, an internal combustion engine of an automobile. In the method, the flat and corrugated metal sheets are brought together so that corrugations of the corrugated metal sheet are successively brought into contact with the flat metal sheet in such a manner that the corrugated metal sheet is freely movable to thereby release resilient stresses therefrom, and a laser beam is incident on a contact line between the flat metal sheet and each of the corrugations of the corrugated metal sheet, to thereby weld them to each other.

15 Claims, 12 Drawing Sheets

METHOD OF PRODUCING CORRUGATED METAL SHEETING AND METHOD OF PRODUCING HONEYCOMB STRUCTURE THEREFROM FOR CARRYING CATALYTIC AGENTS USED FOR PURIFYING EXHAUST GASES

BACKGROUND OF THE INVENTION

1) Field of the Invention

The present invention relates to a method of producing a corrugated metal sheeting comprising a flat metal foil or sheet and a corrugated metal foil or sheet joined to each other, which sheeting is used to produce a carrier or honeycomb structure for carrying catalytic agents used for purifying exhaust gases from, for example, an internal combustion engine of an automobile. The invention also relates to a honeycomb structure produced from the corrugated metal sheeting.

2) Description of the Related Art

It is well known that the honeycomb structure for carrying the catalystic agents can be formed of a ceramic material, for example, based upon cordierite, exhibiting a superior heat resistance. Nevertheless, this ceramic honeycomb structure is inherently brittle and easily broken by an impact thereof. Accordingly, recently a metal honeycomb structure which is not brittle has been developed and is in practical use.

The metal honeycomb structure is produced by forming a roll of a long corrugated metal sheeting or by stacking a plurality of honeycomb-like panels into which the corrugated metal sheeting is cut. The corrugated metal sheeting is produced by joining a flat metal sheet or foil and a corrugated metal sheet or foil to each other by brazing or welding. These flat and corrugated metal sheets may be formed of stainless steels, high-alloy corrosion-resistant steel or the like, and may have a thickness of about from 45 μm to about 1 mm. The metal honeycomb structure produced from the corrugated metal sheeting is received in a metal casing open at each end, so that the honeycomb end faces of the metal honeycomb structure are exposed from each of the openings of the metal casing. The metal casing may be also formed of stainless steels, corrosion-resistant high-alloy-steel or the like, and may have a thickness of about 1 to about 2 mm. The honeycomb structure is fixed in the metal casing by brazing or welding, and catalytic agents are then applied to the metal honeycomb structure in a well-known manner.

In use, the metal casing with the honeycomb structure carrying the catalystic agents is incorporated in an exhaust system of an internal combustion engine of an automobile, and the honeycomb structure is subjected to severe thermal stress because it may be exposed to wide and sudden changes of temperature, for example, from about −25° to about 900° C., and thus the flat and corrugated metal sheets must be securely joined to each other so that they will not be separated due to the severe thermal stress.

It is possible to securely join the flat and corrugated metal sheets, which can endure the severe thermal stress, by brazing. Nevertheless, the joining of the flat and corrugated metal sheets to each other by the brazing is cumbersome and complicated, and further the brazing per se is expensive.

Unexamined Japanese Patent Publication (KOKAI) No. 62-71547 discloses a method of producing the corrugated metal sheeting wherein the flat and corrugated metal sheets are joined to each other by spot-welding. In particular, the flat and corrugated metal sheets are intermittently fed to a nip gap between a roller-shaped electrode and a gear-shaped electrode in such a manner that the corrugated metal sheet is engaged with the gear-shaped electrode and the flat metal sheet is in contact with the roller-shaped electrode. During the passage of the flat and corrugated metal sheets between the roller-shaped and gear-shaped electrodes, which are electrically energized, apexes of the corrugations of the corrugated metal sheet are spot-welded to the flat metal sheet.

This method has an inherent drawback in that the production is not efficient, i.e., the rate of production is limited because of the intermittent feeding of the flat and corrugated metal sheets. Also, the corrugations of the corrugated metal sheet are often subjected to a resilient stress during the welding, because a location at which the corrugations of the corrugated metal sheet should be welded is restrained due to the engagement of the corrugations with the gear-shaped electrode. Accordingly, the corrugations welded to the flat metal sheet are often easily separated therefrom because of the residual resilient stress, and this is, of course, further facilitated by the severe thermal stresses.

The above-mentioned Japanese publication also discloses that the honeycomb structure is produced by forming a roll of the corrugated metal sheeting comprising the flat and corrugated metal sheets spot-welded to each other, and that the roll having a honeycomb structure is united by welding edges of the honeycomb end faces thereof to each other, so that the roll having a honeycomb structure will not be unrolled. Nevertheless, in use, the welded edges may be separated from each other due to the severe thermal stresses, because these thermal stresses tend to be concentrated at the honeycomb end faces of the honeycomb structure, and further, when the welded edges of the honeycomb end faces are separated from each other, a core portion of the honeycomb structure may be telescopically extended due to a flow pressure of the exhaust gas and vibrations generated during the running of the automobile.

Unexamined Japanese Patent Publication (KOKAI) No. 64-40180 discloses a method of producing a honeycomb structure wherein the flat and corrugated metal sheets are formed into a roll while being joined to each other by resistance-welding. In particular, the flat and corrugated metal sheets are tangentially fed to a winder at two diametrical locations thereof in counter feed directions, and first and second pairs of tip electrodes are transversely disposed with respect to the flat and corrugated metal sheets, and are in contact therewith in the vicinity of locations at which they are rolled in, respectively. Therefore, just before the flat metal sheet is rolled in it is welded to the rolled-in corrugated metal sheet by the first pair of tip electrodes in contact with the flat metal sheet, and just before the corrugated metal sheet is rolled in it is welded to the rolled-in flat metal sheet by the second pair of tip electrodes in contact with the corrugated metal sheet. Accordingly, in the thus-produced honeycomb structure, the rolled-in flat and corrugated metal sheets are welded to each other and thus cannot be unrolled.

Nevertheless, in this production method, each of the corrugations of the corrugated metal sheet is only welded to the flat metal sheet at one or two local portions, and accordingly, it is difficult to maintain the unity of the honeycomb structure under a severe thermal stress. Of course, for example, if the first and second pairs of tip electrodes are traversely moved step by step so that the resistance-welding can be repeatedly carried out along each of the corrugations of the corrugated metal sheet, it is possible to obtain a secure joining between the flat metal sheet and each of the corrugations, but in this case, the production rate is very low.

SUMMARY OF THE INVENTION

Therefore, an object of the present invention is to provide a method of producing a corrugated metal sheeting comprising a flat metal sheet or foil and a corrugated metal sheet or foil joined to each other, which sheeting is used to produce a carrier or honeycomb structure for carrying catalytic agents for purifying exhaust gases from, for example, an internal combustion engine of an automobile, wherein the flat and corrugated metal sheets can be securely welded to each other in such a manner that any residual resilient stress is substantially eliminated from the corrugated metal sheet.

Another object of the present invention is to provide a method of producing a carrier or a corrugated metal structure for carrying the catalytic agents, which carrier is produced from the corrugated metal sheeting, wherein a unity of the corrugated metal structure can be ensured under any wide and sudden changes of temperature.

In accordance with the present invention, there is provided a method of producing a corrugated metal sheeting including a flat metal sheet and a corrugated metal sheet joined to each other, which comprises the steps of: bringing the flat and corrugated metal sheets together so that corrugations of the corrugated metal sheet are successively brought into contact with the flat metal sheet in such a manner that the corrugated metal sheet is freely movable to thus release resilient stresses therefrom; and making a laser beam incident on a contact line between the flat metal sheet and each of the corrugations of the corrugated metal sheet, to thereby weld them to each other.

In accordance with another aspect of the present invention, there is provided a method of producing a corrugated metal sheeting including a flat metal sheet and a corrugated metal sheet joined to each other, which comprises the steps of: bringing the flat and corrugated metal sheets together so that corrugations of the corrugated metal sheet are successively brought into contact with the flat metal sheet in such a manner that the corrugated metal sheet is freely movable to thereby release resilient stresses therefrom; and making a pulse laser beam incident on a contact line between the flat metal sheet and each of the corrugations of the corrugated metal sheet, and deflecting the laser beam therealong so that the contact line is scanned by the deflected pulse laser beam to thereby form discrete welding points along the contact line, a scanning speed of the deflected pulse laser beam being slower at side end zones of the contact line than at a central zone thereof.

In accordance with yet another aspect of the present invention, there is provided a method of producing a honeycomb structure from a corrugated metal sheeting as mentioned above, which comprises the steps of: rolling up the corrugated metal sheeting in such a manner that corrugations of the corrugated metal sheeting are successively brought into contact with a smooth surface of a rolled portion obtained from the corrugated metal sheet; and making a laser beam incident on a contact line between the smooth surface of the rolled portion and each of the corrugations of the corrugated metal sheeting, to thereby weld them to each other.

BRIEF DESCRIPTION OF THE DRAWINGS

The other objects and advantages of the present invention will be better understood from the following description, with reference to the accompanying drawings, in which.

DESCRIPTION OF THE PREFERRED EMBODIMENTS

Figure 1:
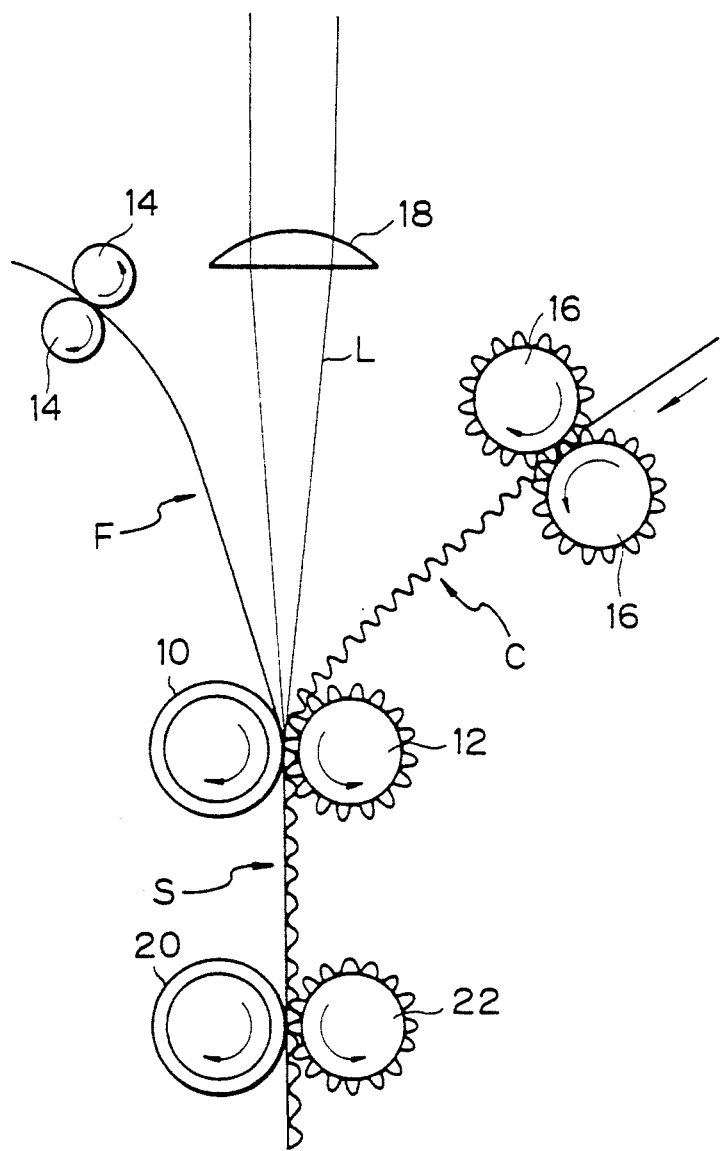
FIG. 1 is a schematic view of an apparatus with which a corrugated metal sheeting production method according to the present invention is carried out.

FIG. 1 schematically shows an apparatus for producing a corrugated metal sheeting from a flat metal foil or sheet and a corrugated metal foil or sheet, which sheeting is used to produce a carrier or honeycomb structure for carrying catalytic agents for purifying exhaust gases from, for example, an internal combustion engine of an automobile. In this drawing, the flat and corrugated metal sheets are indicated by references F and C, and the corrugated metal sheeting produced therefrom is indicated by reference S. The flat and corrugated metal sheets F and C may be formed of stainless steels containing aluminum, high-alloy corrosion-resistant steel (Fe-Cr-Al) or the like, and may have a thickness of about from 50 μm to about 1 mm and a width of less than about 160 mm.

The production apparatus comprises a squeeze roller 10 and a squeeze gear 12 which are freely rotatable and resiliently movable toward each other. A nip gap between the squeeze roller 10 and the squeeze gear 12 is defined as a welding station at which the flat and corrugated metal sheets F and C are joined to each other by laser-welding to produce the corrugated metal sheeting S. A pair of guide rollers 14, 14 for guiding the flat metal sheet F to the welding station is disposed above the squeeze roller 10 and is spaced apart from a vertical plane extending through the nip gap between the squeeze roller 10 and the squeeze gear 12, by a given distance. A pair of forming gears 16, 16 for forming the corrugated metal sheet C from a flat metal sheet material is disposed above the squeeze gear 12 and is spaced apart from the above-mentioned vertical plane by a given distance, and the corrugated metal sheet C formed by the pair of forming gears 16, 16 is directed to the welding station. With this arrangement, the flat metal and corrugated metal sheets F and C are spread upward from the nip or welding station between the squeeze roller 10 and the squeeze gear 12 so that a laser beam L such as a YAG laser beam, a $CO_2$ laser beam or the like can be made incident on the welding station to thus weld the flat and corrugated metal sheets F and C to each other. A cylindrical lens 18 is used to focus the laser beam L on the welding station, so that the laser energy is concentrated thereat. Note, although the laser beam L is exaggeratedly illustrated, it actually has a small diameter. For example, the YAG laser beam has a diameter of from about 6 to about 10 mm before it is incident on the cylindrical lens 18, and has a focused diameter of from about 0.5 to about 3 mm in a zone of the depth of focus. A drive roller 20 and a drive gear 22 are disposed just below the squeeze roller 10 and the squeeze gear 12, and are engaged with the flat and corrugated sides of the corrugated metal sheeting S, respectively. As apparent from FIG. 1, the drive roller 20 and the drive gear 22 are driven by a suitable drive source (not shown) to move the corrugated metal sheeting S downward, so that the flat and corrugated metal sheets F and C are pulled into the nip gap or welding station between the squeeze roller 10 and the squeeze gear 12, and then brought together thereat.

Figure 2A:
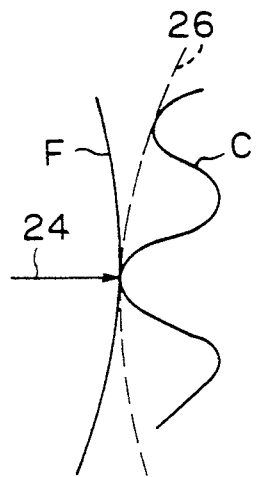
FIGS. 2(a), 2(b), 2(c) and 2(d) are schematic views showing how corrugations of a corrugated metal sheet are brought into contact with a flat metal sheet.

The welding is carried out in such a manner that each of the corrugations of the corrugated metal sheet C is joined to the flat metal sheet F at the apex thereof. To this end, the laser beam L is preferably focused by the cylindrical lens 18 on a squeeze location 24 (FIG. 2(a)) at which a contour line 26 described by the teeth of the squeeze gear teeth 12 is in contact with the squeeze roller 10, because the apexes of the corrugations of the corrugated metal sheet C must be successively brought into contact with the flat metal sheet F at the squeeze location 24 while the flat and corrugated metal sheets F and C are pulled into the welding station. Thus, the location at which a contact between the apex of the corrugation and the flat sheet metal sheet F occurs can be irradiated by the focused laser beam L so that the materials are melted and the apex of the corrugation thus joined to the flat metal sheet by the welding.

In practice, however, all of the corrugations of the corrugated metal sheet C are not always in contact with the flat metal sheet F at the squeeze location 24, because of the clearances maintained between the corrugations of the corrugated metal sheet C and the teeth of the squeeze gear 12 so that the corrugated metal sheet C is freely movable to thus release resilient stresses therefrom at the welding station. Namely, the corrugation of the corrugated metal sheet C may be in contact with the flat metal sheet F at a location other than the squeeze location 24, as shown in FIGS. 2(b) and 2(c), and further, the two adjacent corrugations thereof may be in contact with the flat metal sheet F at both sides of the squeeze location, as shown in FIG. 2(d).

Figure 2B:
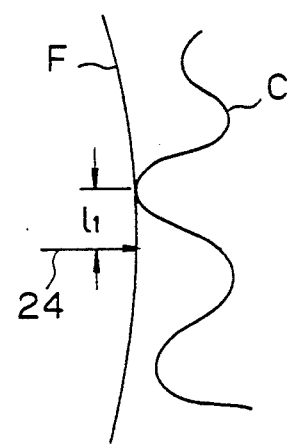
Figure 2C:
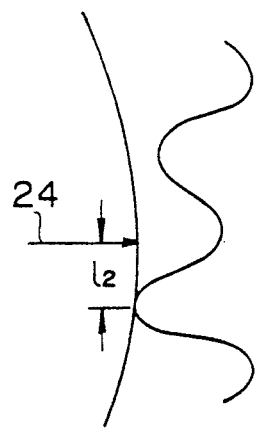
Figure 2D:
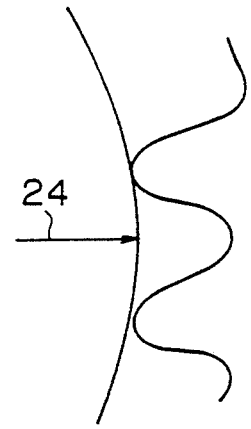
Figure 3:
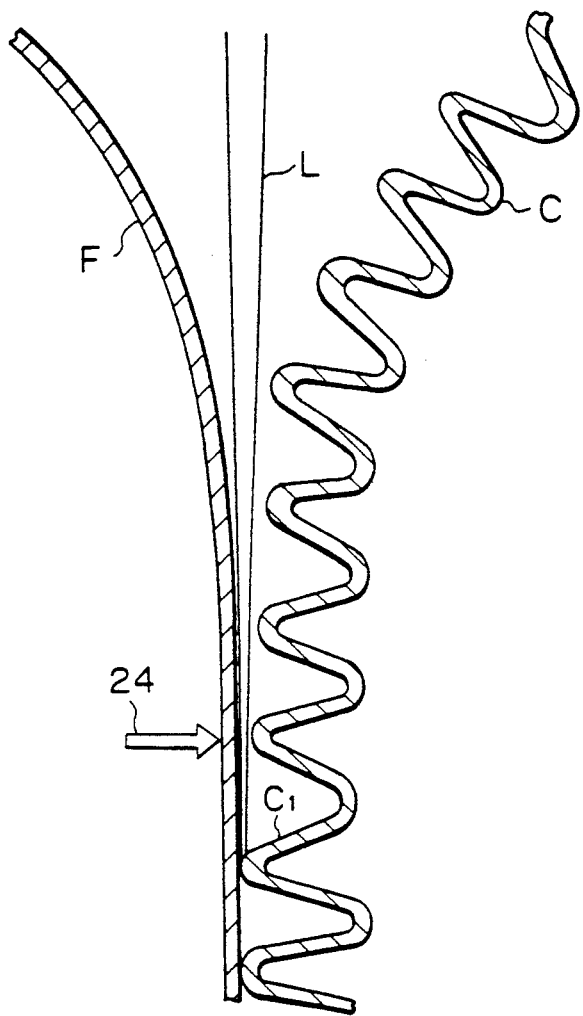
FIG. 3 is a partially enlarged view of the flat and corrugated metal sheets when brought together, wherein a laser beam is incident on a contact line between a flat metal sheet and a corrugation of a corrugated metal sheet of FIG. 1.
Figure 4:
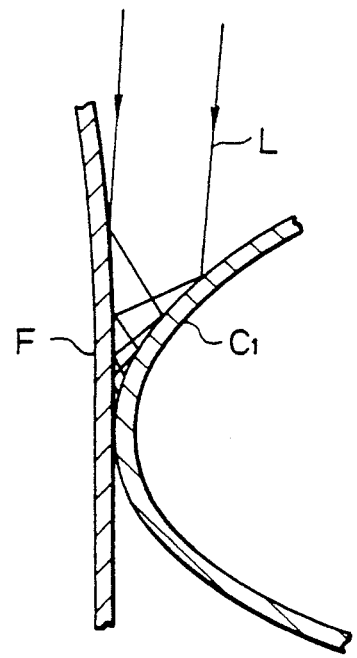
FIG. 4 is a partial further enlarged view of FIG. 3.

In the cases as shown in FIGS. 2(b) and 2(c), for example, when the corrugations of the corrugated metal sheet C have a pitch of about 2.5 mm, a maximum distance ($l_1$, $l_2$) by which the corrugation is offset from the squeeze location 24 is about ±1.25 mm. Accordingly, the focused laser beam L must have a depth of focus which is more than the maximum offset range ($l_1 + l_2$) before a proper welding can be ensured in the cases as shown in FIGS. 2(b) and 2(c). Nevertheless, according to the present invention, the depth of focus may be less than the maximum offset range ($l_1 + l_2$), because the laser energy can be concentrated at the location of the contact between the apex of the corrugation and the flat metal sheet F. In particular, for example, FIG. 3 shows a case similar to FIG. 2(c), in which a corrugation $C_1$ of the corrugated metal sheet C is in contact with flat metal sheet F below the squeeze location 24. In this case, the laser beam L introduced into a V-shaped space defined by the corrugation $C_1$ and the flat metal sheet F can be converged by reflections at the location of the contact between the apex of the corrugation $C_1$ and the flat metal sheet F, as shown in FIG. 4. The same holds true for the cases as shown in FIGS. 2(b) and 2(d). Thus, according to the present invention, the depth of focus of the focused laser beam L can be virtually expanded so that the welding between the apexes of the corrugations and the flat metal sheet F can be securely and continuously carried out. For example, where the cylindrical lens 18 has a focal distance of 75 mm, the focused laser beam L may have a virtual depth of focus of ±1.25 mm. Also, this means that a cumbersome optical adjustment needed for exactly focussing the laser beam L on the squeeze location 24 becomes unnecessary. Namely, the focus of the laser beam L can be relatively misaligned with the squeeze location 24.

Figure 5:
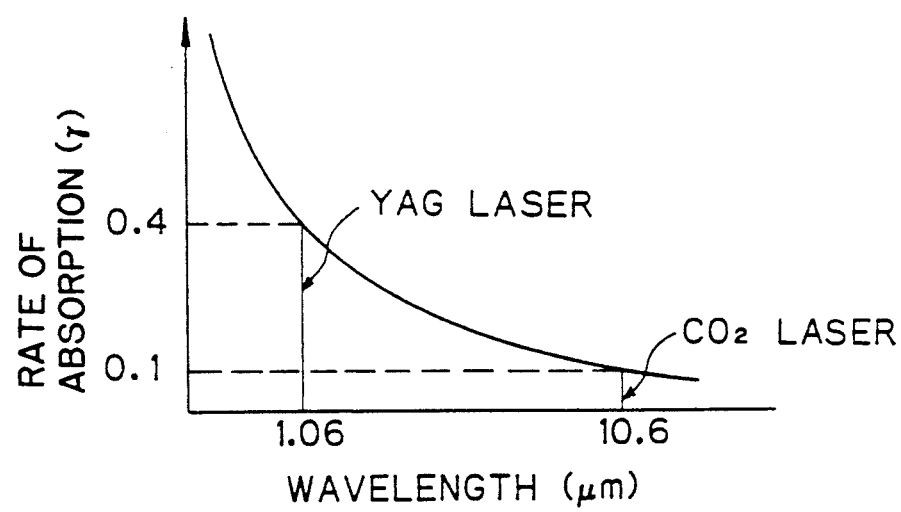
FIG. 5 is a graph showing a relationship between a wavelength of a laser beam and a rate of absorption at which the laser beam is absorbed by the flat and corrugated metal sheets.

While the laser beam L is reflected in the V-shaped space defined by the flat metal sheet F and the corrugation of the corrugated metal sheet C, a part of the laser energy is absorbed by the materials of the metal sheets. The rate of absorption of the laser energy varies in accordance with a wavelength of the laser beam used, because the material surfaces of the metal sheets have a light absorption characteristic which is dependent on a wavelength of the laser beam. For example, in the light absorption characteristic as shown in FIG. 5, a YAG laser beam having a wavelength of 1.06 μm has a reflectivity of about 60% ($=1-\gamma$), and a $CO_2$ laser beam having a wavelength of 10.6 μm has a refectivity of about 90%. Although the $CO_2$ laser beam exhibits an energy concentration superior to that of the YAG laser beam, this does not exclude the use of YAG laser in the application of the present invention.

Figure 6:
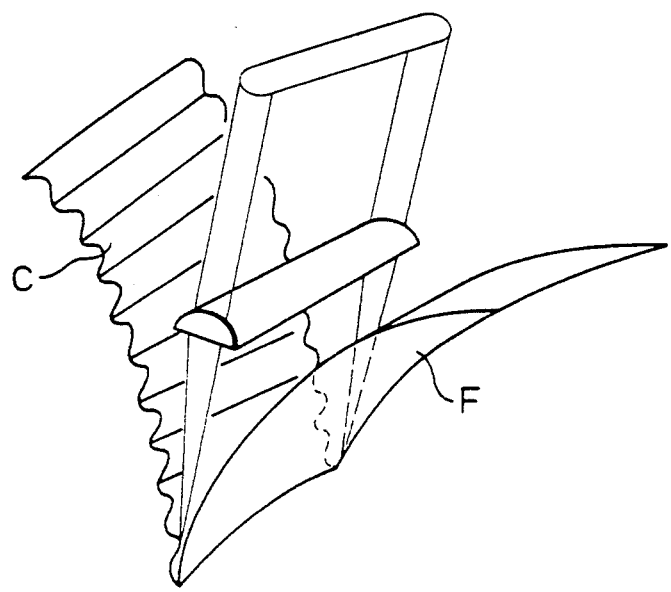
FIG. 6 is a partial perspective view showing a welding method in which the flat and corrugated metal sheets are welded to each other by a sheet-shaped laser beam.

To ensure that each of the corrugations of the corrugated metal sheet C is transversely and longitudinally welded to the flat metal sheet F, the laser beam L may be deformed into a sheet-like shape having a width corresponding to that of the metal sheets F and C, as shown in FIG. 6. Namely, the sheet-shaped laser beam L is focused by the cylindrical lens 18 on the contact line between the flat metal sheet F and the corrugation of the corrugated metal sheet C, and thus the welding is transversely and continuously carried out therealong. Note, the deformation of the laser beam into the sheet-like shape is performed by using, for example, an integration mirror, as is well-known in this field.

Figures 7A, 7B:
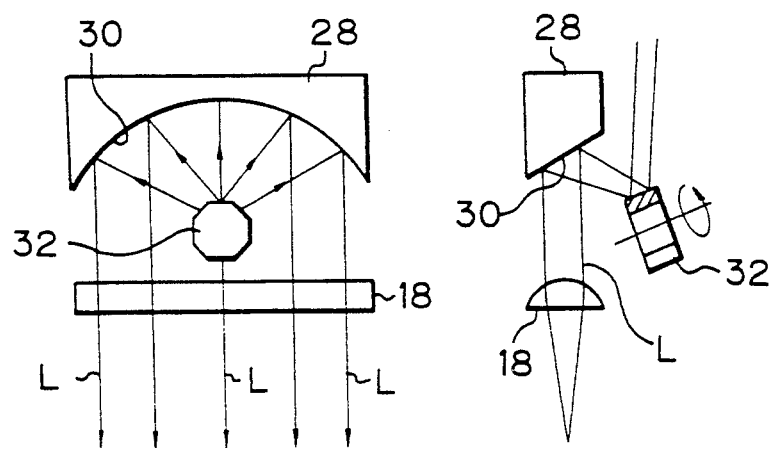
FIG. 7(a) is a schematic front view showing a laser beam scanning system.
FIG. 7(b) is a side view of FIG. 7(a)

Alternatively, the laser beam L may be irradiated to the contact line between the flat metal sheet F and the corrugation of the corrugated metal sheet C by a suitable optical scanning system, as shown in FIGS. 7(a) and 7(b), which includes a reflector 28 disposed above the cylindrical lens 18 and having a slanted cylindrical reflecting surface 30, and a polygon mirror 32 disposed beside a space between the reflector 28 and the cylindrical lens 18 so that the laser beam L made incident thereon is reflected from the polygon mirror 32 toward the slanted cylindrical reflecting surface 30. With this arrangement of the optical scanning system, the contact line between the flat metal sheet F and the corrugation of the corrugated metal sheet C is scanned with the deflected and focused laser beam L, so that the corrugation of the corrugated metal sheet C can be transversely welded to the flat metal sheet F.

Figure 8A:
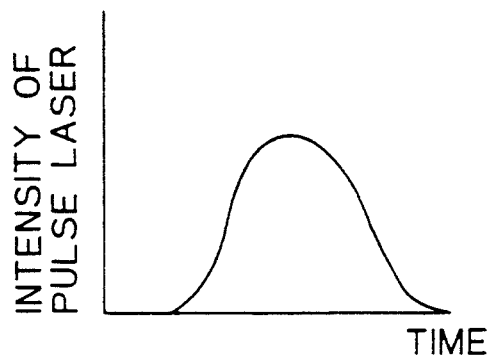
FIG. 8(a) is a view showing an acute pulse shape of a pulse laser beam.
Figure 8B:
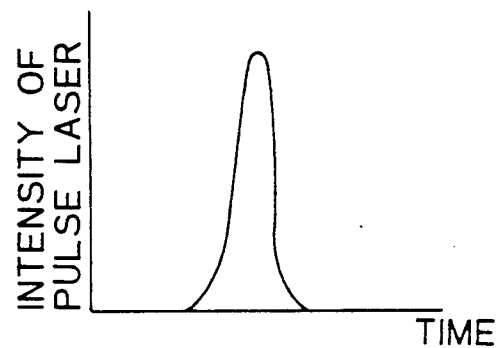
FIG. 8(b) is a view showing a blunt pulse shape of a pulse laser beam.

The laser beam L may be a pulse laser beam so that the welding is discretely carried out along the contact line between the flat metal sheet F and the corrugation of the corrugated metal sheet C. Where at least one of the flat and corrugated metal sheets F and C is relatively thin, preferably an acute pulse shape having a relatively narrow width is given to the pulse laser beam. Namely, the pulse laser beam L should have an acute pulse shape as shown in FIG. 8(a) rather than a blunt pulse shape as shown in FIG. 8(b). This is because an amount of thermal energy irradiated at the welding point by the acute pulse laser beam is smaller than that of the blunt pulse laser beam. In particular, an amount of thermal energy irradiated at the welding point by the blunt pulse laser beam is larger, and a time for which the thermal energy is irradiated at the welding point thereby is longer, and thus the material of the thin metal sheet or foil may be excessively melted to a point that a hole is formed therein. Conversely, although the acute pulse laser beam of FIG. 8(a) has a higher peak than that of the blunt pulse laser beam of FIG. 8(b), an amount of thermal energy irradiated at the welding point by the acute pulse laser beam is smaller, and a time for which the thermal energy is irradiated at the welding point is shorter, and thus the material of the thin metal sheet or foil cannot be excessively melted and a proper welding can be safely carried out.

Figure 9:
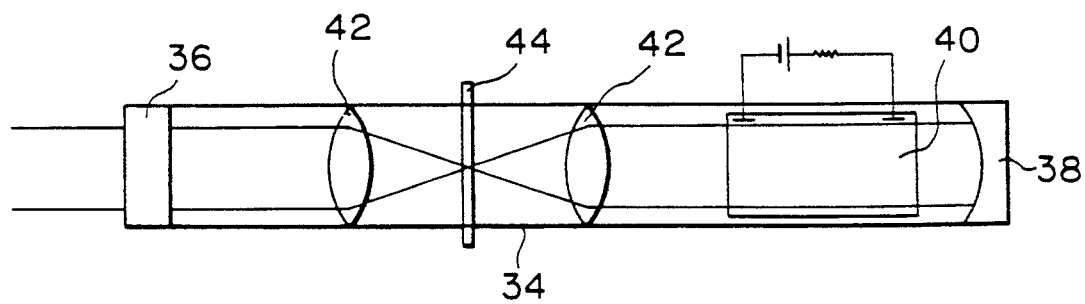
FIG. 9 is a schematic view showing a Q-switched laser oscillator.

The acute pulse laser beam as mentioned above may be obtained by, for example, a well-known Q-switched $CO_2$ laser oscillator as shown in FIG. 9. This laser oscillator comprises a resonace tube 34 having a half mirror 36 and a reflector 38 disposed at the ends thereof, an electric $CO_2$ gas-discharging tube 40 disposed within the resonace tube 34 near the reflector 38, a pair of convex lenses 42, 42 disposed within the resonace tube 34 such that there is a common focal point therebetween, and an optical chopper 44 allowing and shutting off a passage of light at a given frequency. While the optical chopper 44 is closed, $CO_2$ is excited from the ground level to a certain energy level, and while the optical chopper 44 is opened, a light generated in the discharging tube 40 is oscillated and amplified between the half mirror 36 and the reflector 38, whereby the acute pulse laser beam as shown in FIG. 8(a) can be output from the half mirror 36.

As apparent from the foregoing, according to the present invention a welding can be carried out in such a manner that resilient stress can be released from the corrugated metal sheet C, because the corrugated metal sheet C is freely movable, to thus release resilient stress therefrom at the welding station, due to the clearances between the corrugations of the corrugated metal sheet C and the teeth of the squeeze gear 12. This is a significant feature of the present invention, because the residual resilient stresses can be substantially eliminated from the finished corrugated metal sheeting S shown in FIG. 1, and thus the corrugations welded to the flat metal sheet do not have a tendency to separate from each toher due to the residual resilient stresses.

Figure 10:
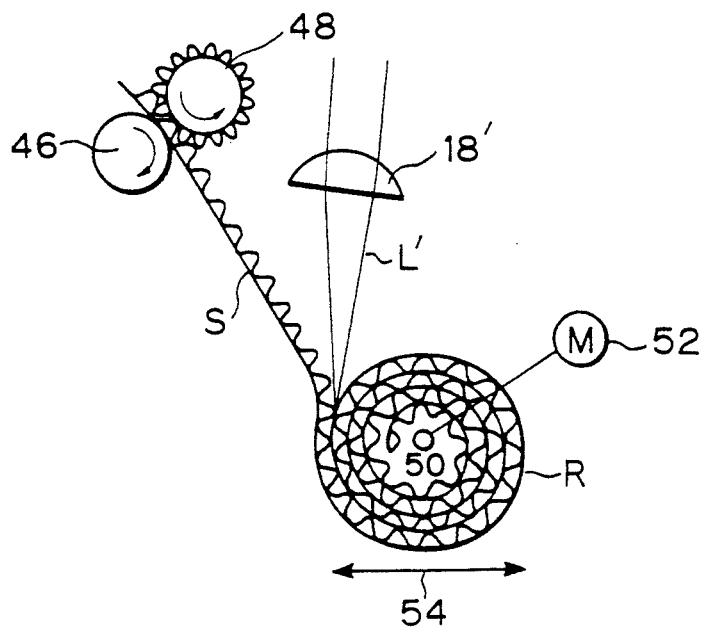
FIG. 10 is a schematic view showing a honeycomb structure production method according to the present invention.

FIG. 10 shows a method of producing the honeycomb structure from the corrugated metal sheeting S produced by the method shown in FIG. 1. The corrugated metal sheet S is fed through a guide roller 46 and a guide gear 48, and is then rolled up by a suitable winder shaft 50 driven by an electric motor 52 (symbolically illustrated). As shown in FIG. 10, while the corrugated metal sheeting S is rolled up, the corrugations of the corrugated metal sheeting S are successively welded to a smooth surface of the rolled portion R by a laser beam L', such as a YAG laser beam, a $CO_2$ laser beam or the like, in substantially the same manner as mentioned above. Namely, the laser beam L' is focused by a cylindrical lens 18' on a location at which each of the corrugations of the corrugated metal sheeting S is brought into contact with the smooth surface of the rolled portion R to form a V-shaped space therebetween, and thus the welding can be carried out in substantially the same manner as mentioned above. Note, the winder shaft 50 is movable in the two directions indicated by an arrow 54, and as a radius of the rolled portion R is increased, it is controlled to move in one of two directions (i.e., right in FIG. 10) so that the laser beam L' can be always made incident on the location at which each of the corrugations of the corrugated metal sheeting S is in contact with the smooth surface of the rolled portion R.

Figure 11A:
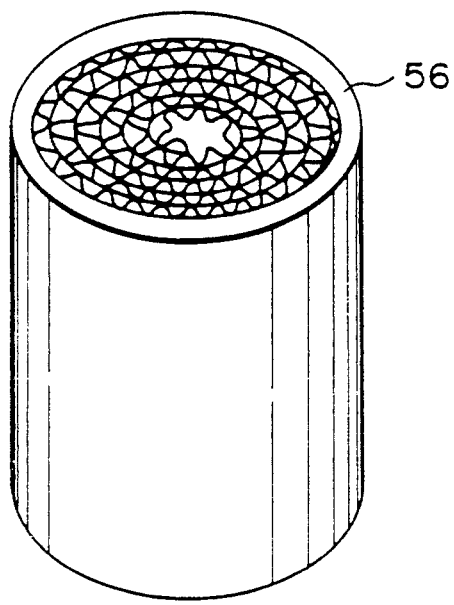
FIG. 11(a) is a perspective view showing a carrier or honeycomb structure for carrying catalytic agents for purifying exhaust gases.
Figure 11B:
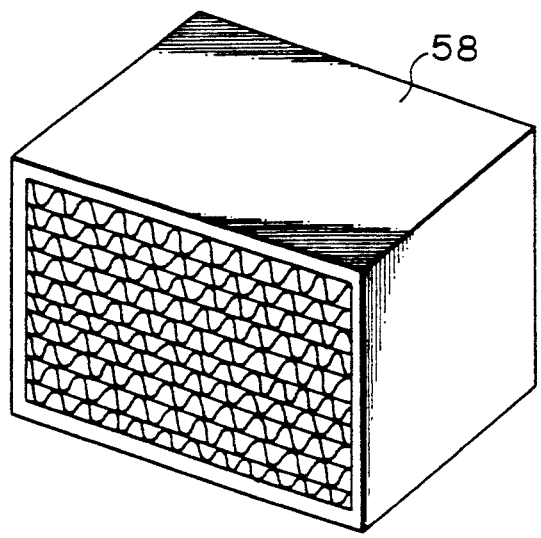
FIG. 11(b) is a perspective view showing another type of carrier or honeycomb structure for carrying catalytic agents for purifying exhaust gases.

As shown in FIG. 11(a), the honeycomb structure thus-produced is received in a cylindrical metal casing 56 having an opening at each end thereof, such that the honeycomb end faces of the honeycomb structure are exposed from these openings. The cylindrical metal casing 56 may be formed of stainless steels, corrosion-resistant high-alloy-steel or the like, and may have a thickness of about 1 to about 2 mm. The honeycomb structure is fixed in the cylindrical metal casing 56 by a conventional welding method, and catalytic agents are then applied to the metal honeycomb structure in a well-known manner. Further, the honeycomb structure may be produced by stacking a plurality of honeycomb panels into which the corrugated metal sheeting S is cut; these stacked honeycomb panels are joined by a conventional welding method, and then received in a box-like metal casing 58 having an opening at each side thereof, as shown FIG. 11(b). The box-like metal casing 58 may be also formed of the same material as the cylindrical metal casing 56. Similarly, the stacked honeycomb panels or honeycomb structure is fixed in the box-like metal casing 58, and the catalytic agents are then applied to the metal honeycomb structure in a well-known manner.

Figure 12:
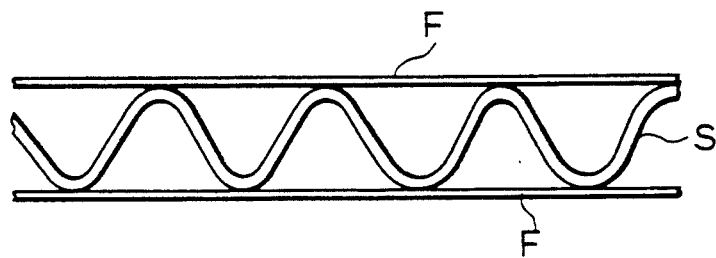
FIG. 12 is a side view showing another type of the corrugated metal sheeting produced by a production method according to the present invention.
Figure 13:
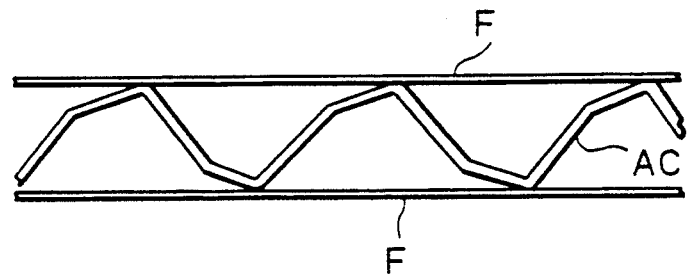
FIG. 13 is a side view showing a modification of the corrugated metal sheeting of FIG. 12.

When the honeycomb structure is constructed from the honeycomb panels, these honeycomb panels may be obtained from a corrugated metal sheeting as shown in FIG. 12, in which a corrugated metal sheet C is sandwiched by two flat metal sheets F, and which can be produced in substantially the same manner as mentioned above. FIG. 13 shows a modification of the corrugated metal sheeting of FIG. 12, in which an angularly corrugated metal sheet AC is substituted for the corrugated metal sheet C.

Figure 14:
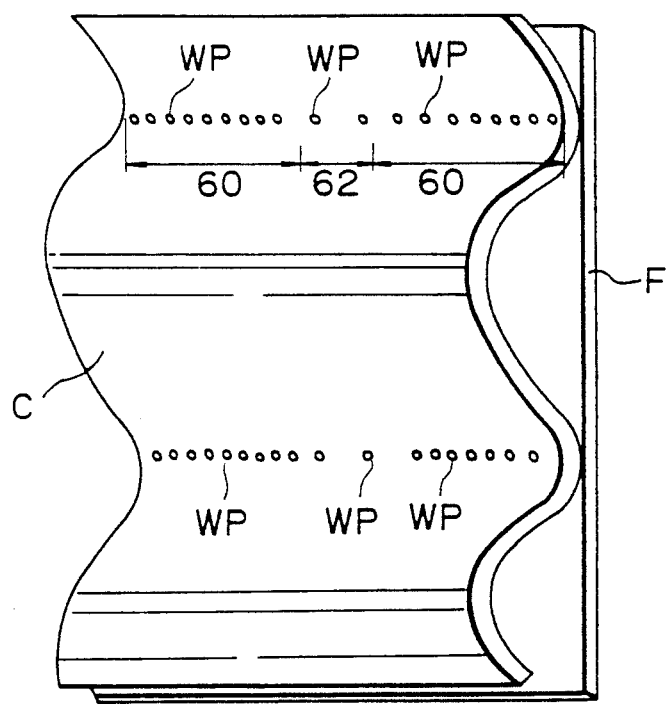
FIG. 14 is a partial schematic perspective view showing a corrugated metal sheeting produced by a production method according to the present invention.

As schematically shown in FIG. 14, when the welding is discretely carried out along the contact line between the flat metal sheet F and the corrugation of the corrugated metal sheet C, i.e., when a plurality of welding points WP are formed along the contact line therebetween, preferably the pitches of the welding points WP are closer to each other at the side end zones 60, 60 of the contact line than at a central zone 62 thereof. This is because, when the honeycomb structure is produced from the corrugated metal sheeting and is used as the carrier for the catalytic agents for purifying the exhaust gases, the corrugations are more easily separated from the flat metal sheet F at the side end zones 60, 60 than at the central zone 62 thereof, because the severe thermal stress has a tendency to be concentrated at the side end zones 60, 60.

Figure 15:
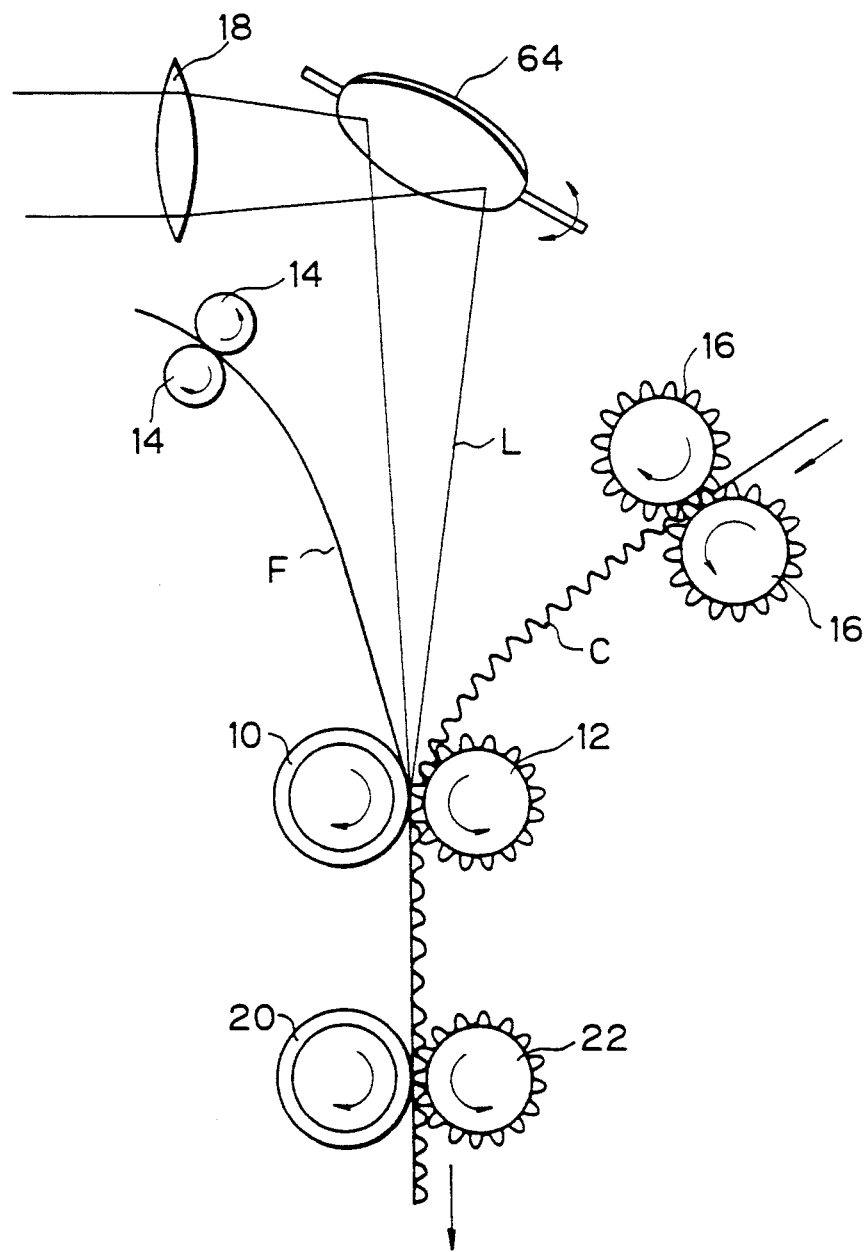
FIG. 15 is a schematic view of an apparatus by which a corrugated metal sheeting production method according to the present invention is carried out to produce the corrugated metal sheeting of FIG. 14.
Figure 16:
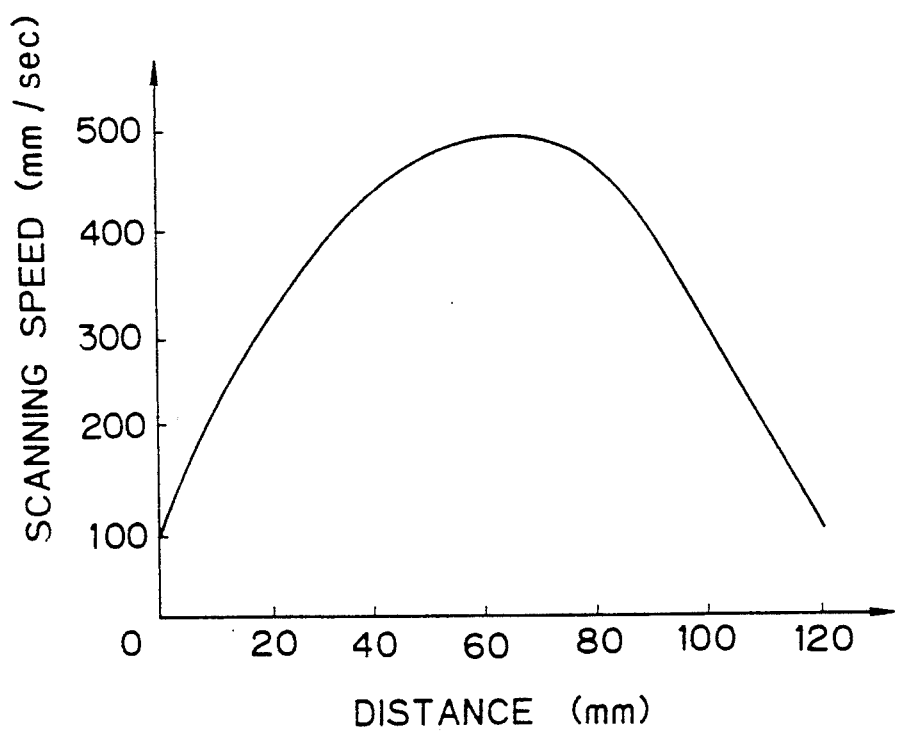
FIG. 16 is a graph showing a relationship between a scanning speed of a laser beam and a distance measured from one end of a contact line between a flat metal sheet and a corrugation of a corrugated metal sheet of the corrugated metal sheeting of FIG. 14.
Figure 17:
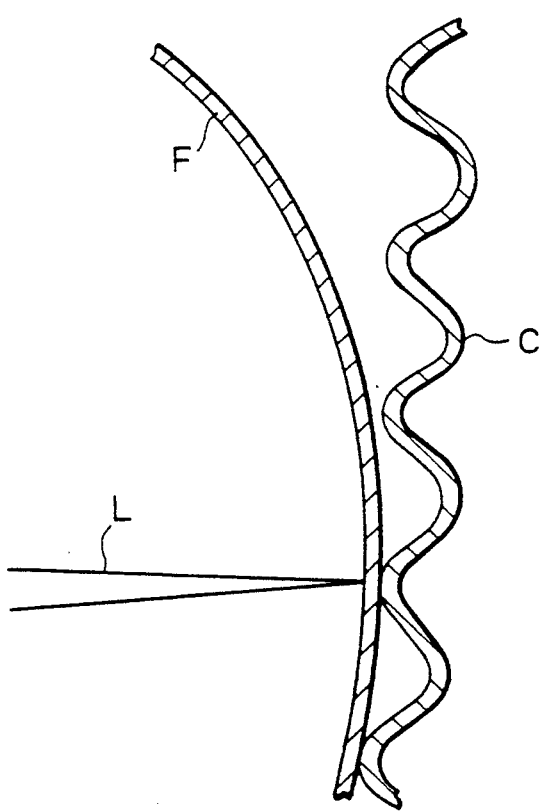
FIG. 17 is a partially enlarged view of the flat and corrugated metal sheets which are brought together, in which a laser beam is incident on the flat metal sheet along the contact line between the flat metal sheet and a corrugation of the corrugated metal sheet of the corrugated metal sheeting of FIG. 14.

FIG. 15 schematically shows an apparatus for producing the corrugated metal sheeting as shown in FIG. 14. In this drawing, the same references as in FIG. 1 represent the same elements. This production apparatus features a galvano-mirror 64 by which the laser beam L is deflected at a variable speed. In particular, the contact line between the flat metal sheet F and the corrugation of the corrugated metal sheet C is scanned with the deflected laser beam L so that the scanning speed is varied as shown in a graph of FIG. 16 (Note, the abscissa thereof represents a distance measured from one end of the contact line). As apparent from this graph, the scanning speed is slower at the side end zones 60, 60 than at the central zone 62, and thus a discrete welding can be carried out as shown in FIG. 14. It is possible to control the scanning speed, as shown in the graph of FIG. 16, by energizing a drive circuit (not shown) for the galvano-mirror 64 with a voltage which is varied to be analogous to the characteristic of FIG. 16. When only the discrete welding as mentioned above is desired, the laser beam L may be made incident on the flat metal sheet F along the contact line, as shown in FIG. 17.

The present invention was actually embodied as shown in the following examples:

EXAMPLE I (1) Flat and corrugated sheets having a width of 120 mm were obtained from ferrite type stainless steel sheets containing 15% Cr and 4.5% Al and having a thickness of 50 μm.

(2) A corrugated sheeting was produced from these flat and corrugated sheets according to the production method as shown in FIG. 1, by using a normal pulse YAG laser beam (100 pps) having a pulse energy of 200 mJ. The rate of production was 10 m/min.

(3) A honeycomb structure was produced from this corrugated sheeting according to the production method as shown in FIG. 10, by using the same normal pulse YAG laser beam as in the production of the corrugated sheeting. The rate of production was 10 m/min.

(4) The honeycomb structure thus-produced was received in a cylindrical casing made of SUS 304 stainless steel (AISI 304), to thereby obtain a metal carrier as shown FIG. 11(a).

(5) For testing, the metal carrier was incorporated in an exhaust gas system for an internal combution engine, and was maintained at a temperature of 850° C. over a period of 300 hours. No damage thereto was found, and further, the core portion of the honeycomb structure was not telescopically extended.

EXAMPLE II (1) Flat and corrugated sheets having a width of 100 mm were obtained from ferrite type stainless steel sheet containing 15% Cr and 4.5% Al and having a thickness of 50 μm.

(2) A corrugated sheeting was produced from these flat and corrugated sheets according to the production method as shown in FIG. 1, by using a sheet-shaped $CO_2$ laser beam (1 kW) having a width of 100 mm, and a cylindrical lens having a focal distance of 75 mm. The rate of production was 7 m/min.

(3) A honeycomb structure was produced from this corrugated sheeting according to the production method as shown in FIG. 10, by using the same sheet-shaped $CO_2$ laser beam as in the production of the corrugated sheeting. The rate of production was 7 m/min.

(4) The honeycomb structure thus produced was received in a cylindrical casing made of SUS 304 stainless steel (AISI 304), to thereby obtain a metal carrier as shown FIG. 11(a).

(5) The metal carrier was tested under the same conditions as in EXAMPLE I. No damage thereto was found, and further, the core portion of the honeycomb structure was not telescopically extended.

EXAMPLE III (1) Flat and corrugated sheets having a width of 120 mm were obtained from ferrite type stainless steel sheet containing 15% Cr and 4.5% Al and having a thickness of 50 μm.

(2) A corrugated sheeting was produced from these flat and corrugated sheets according to the production method as shown in FIG. 1, by using a $CO_2$ pulse laser beam (12 kHz) obtained from a laser oscillator (as shown in FIG. 9) and having a pulse energy of 200 mJ. The rate of production was 15 m/min.

(3) A honeycomb structure was produced from this corrugated sheeting according to the production method as shown in FIG. 10, by using the same $CO_2$ pulse laser beam as in the production of the corrugated sheeting. The rate of production was 15 m/min.

(4) The honeycomb structure thus produced was received in a cylindrical casing made of SUS 304 stainless steel (AISI 304), to thereby obtain a metal carrier as shown FIG. 11(a).

(5) The metal carrier was tested under the same conditions as in EXAMPLE I. No damage thereto was found, and further, the core portion of the honeycomb structure was not telescopically extended.

EXAMPLE IV (1) Flat and corrugated sheets having a width of 120 mm were obtained from ferrite type stainless steel sheet containing 15% Cr and 4.5% Al and having a thickness of 100 μm.

(2) A corrugated sheeting was produced from these flat and corrugated sheets according to the production method as shown in FIG. 1, by using a $CO_2$ pulse laser beam (12 kHz) obtained from a laser oscillator (as shown in FIG. 9) and having a pulse energy of 200 mJ, and a cylindrical lens having a focal distance of 75 mm. The rate of production was 10 m/min.

(3) A honeycomb structure was produced from this corrugated sheeting according to the production method as shown in FIG. 10, by using the same $CO_2$ pulse laser beam as in the production of the corrugated sheeting. The rate of production was 10 m/min.

EXAMPLE V (1) Flat and corrugated sheets having a width of 120 mm were obtained from ferrite type stainless steel sheet containing 15% Cr and 4.5% Al and having a thickness of 50 μm.

(2) A corrugated sheeting was produced from these flat and corrugated sheets according to the production method as shown in FIG. 1, by using a normal pulse YAG laser beam (100 pps) having a pulse energy of 200 mJ and by deflecting the laser beam at the variable scanning speed shown in FIG. 16.

(3) A honeycomb structure was produced from this corrugated sheeting according to the production method as shown in FIG. 15, by using the same normal pulse YAG laser beam as in the production of the corrugated sheeting and by deflecting the laser beam at the same variable scanning speed.

(4) The honeycomb structure thus produced was received in a cylindrical casing made of SUS 304 stainless steel (AISI 304), to thereby obtain a metal carrier as shown FIG. 11(a).

(5) For testing, the metal carrier was incorporated in an exhaust gas system for an internal combution engine of 3000 cc, and was maintained at a temperature of 850° C. over a period of 400 hours. No damage thereto was found, and further, the core portion of the honeycomb structure was not telescopically extended.

Finally, it will be understood by those skilled in the art that the foregoing description is of preferred embodiments of the disclosed method, and that various changes and modifications may be made to the present invention without departing from the spirit and scope thereof.

We claim:

1. A method of producing a corrugated metal sheeting including a flat metal sheet and a corrugated metal sheet joined to each other, said method comprising the steps of:

bringing said flat and corrugated metal sheets together so that corrugations of said corrugated metal sheet are successively brought into contact with said flat metal sheet in such a manner that said corrugated metal sheet is freely movable to thereby release resilient stresses therefrom; and making a laser beam incident on a contact line between said flat metal sheet and each of the corrugations of said corrugated metal sheet, to thereby weld them to each other.

2. A method as set forth in claim 1, wherein said laser beam is deformed into a sheet-shaped laser beam having a width corresponding to that of said flat and corrugated metal sheets, and is focused upon said contact line.

3. A method as set forth in claim 2, wherein said laser beam is a continuous laser beam and each of the corrugations of said corrugated metal sheet is continuously welded to said flat metal sheet along said contact line.

4. A method as set forth in claim 1, wherein said laser beam is deflected along said contact line, and is focused upon said contact line.

5. A method as set forth in claim 4, wherein said laser beam is a continuous laser beam and each of the corrugations of said corrugated metal sheet is continuously welded to said flat metal sheet along said contact line.

6. A method as set forth in claim 5, wherein said laser beam is a pulse laser beam and each of the corrugations of said corrugated metal sheet is discretely welded to said flat metal sheet along said contact line.

7. A method as set forth in claim 6, wherein said pulse laser beam is obtained from a Q-switched pulse laser oscillator.

8. A method of producing a corrugated metal sheeting including a flat metal sheet and a corrugated metal sheet joined to each other, said method comprising the steps of:

bringing said flat and corrugated metal sheets together so that corrugations of said corrugated metal sheet are successively brought into contact with said flat metal sheet in such a manner that said corrugated metal sheet is freely movable to thereby release resilient stress therefrom; and making a pulse laser beam incident on a contact line between said flat metal sheet and each of the corrugations of said corrugated metal sheet, and deflecting said laser beam therealong so that said contact line is scanned by the deflected pulse laser beam to form discrete welding points along said contact line, a scanning speed of said deflected pulse laser beam being slower at side end zones of said contact line than at a central zone thereof.

9. A method of producing a honeycomb structure from a corrugating metal sheeting as set forth in any one of claims 1 and 8, said method comprising:

rolling up said corrugated metal sheeting in such a manner that corrugations of said corrugated metal sheeting are successively brought into contact with a smooth surface of a rolled portion obtained from said corrugated metal sheet; and making a laser beam incident on a contact line between the smooth surface of said rolled portion and each of the corrugations of said corrugated metal sheeting, to thereby weld them to each other.

10. A method as set forth in claim 9, wherein said laser beam is deformed into a sheet-shaped laser beam having a width corresponding to that of said corrugated metal sheeting, and is focused upon said contact line.

11. A method as set forth in claim 10, wherein said laser beam is a continuous laser beam and each of the corrugations of said corrugated metal sheeting is continuously welded to the smooth surface of said rolled portion.

12. A method as set forth in claim 9, wherein said laser beam is deflected along said contact line, and is focused upon said contact line.

13. A method as set forth in claim 12, wherein said laser beam is a continuous laser beam and each of the corrugations of said corrugated metal sheeting is continuously welded to the smooth surface of said contact line.

14. A method as set forth in claim 12, wherein said laser beam is a pulse laser beam and each of the corrugations of said corrugated metal sheeting is discretely welded to the smooth surface of said rolled portion along said contact line.

15. A method as set forth in claim 14, wherein said pulse laser beam is obtained from a Q-switched pulse laser oscillator.

* * * * *